Patented Sept. 13, 1927.

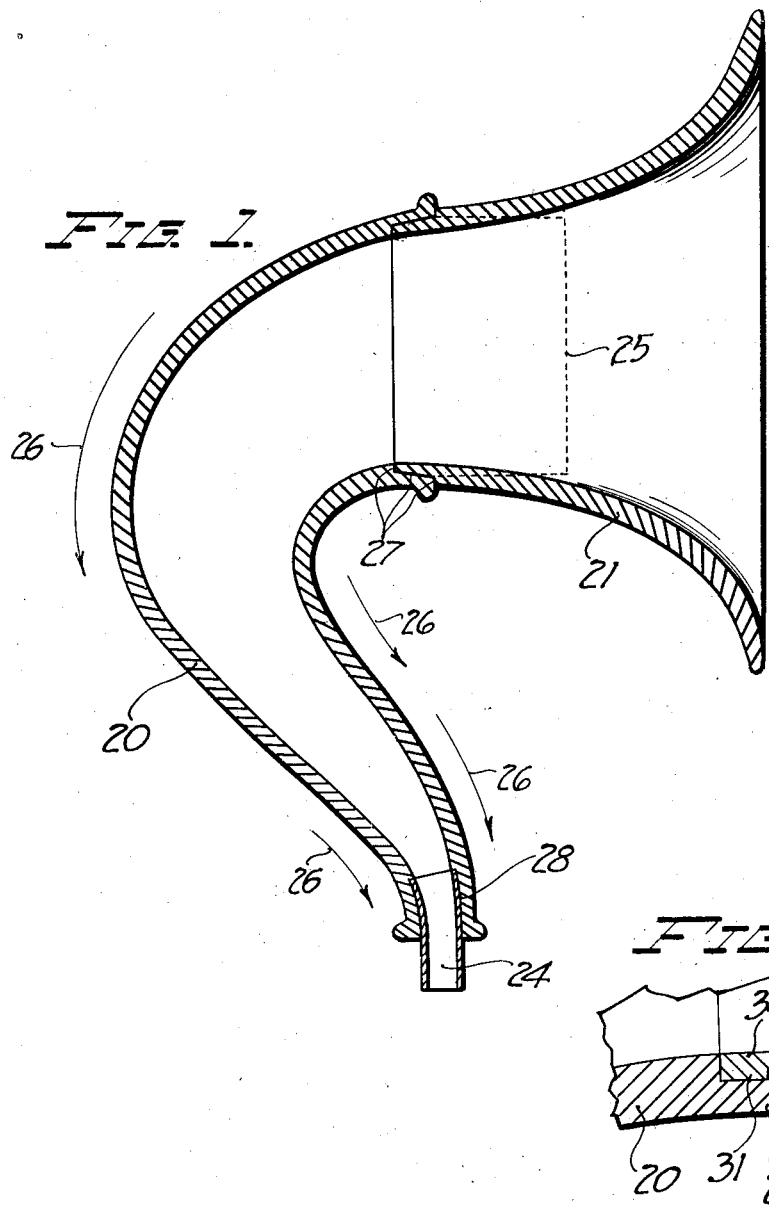

1,642,664

UNITED STATES PATENT OFFICE.

ALBERT E. SIDNELL AND EMILIUS C. F. HARTMANN, OF SALT LAKE CITY, UTAH.

METHOD FOR MAKING IRREGULARLY-CORED ARTICLES OF HARD RUBBER AND THE LIKE.

Application filed February 18, 1925. Serial No. 10,033.

This invention relates to a process for making irregularly cored articles of hard rubber and the like, in two vulcanizing stages, and its principal objects are:

First. To render possible the use of a one-piece core, if desired.

Second. To make complex molded and cored articles of separate sections, assembling the sections when partly vulcanized, and then completing the vulcanization of each assemblage in a final stage, where it would be difficult or even impossible, to make the articles in one piece in one vulcanization, due to the odd shape thereof.

Third. To reduce the time necessary for articles to remain in the molds, thus releasing them in a fractional part of the time usually necessary, and reducing accordingly, the amount of capital invested in molds. For instance, the first stage generally occupies only about one-third of the entire time required for vulcanizing, thus reducing by two-thirds, the mold investment.

Fourth. To eliminate the usual mechanical joints necessary when complex articles consist of separate sections of completely vulcanized material. Such joints generally consist of metal parts, threaded, slotted and pinned or set-screwed together, and are liable to loosen and cause disturbed vibrations, besides being costly to produce.

Fifth. To reduce the cost and to improve the quality of articles to the manufacture of which this process is applicable.

Sixth. To take full advantage of the superiority in resonance and tone-giving qualities of hard rubber over other substances for the horns of so-called loud-speakers, by vulcanizing the horns as one piece.

While this process is especially advantageous in the manufacture of the horns for loud-speakers, it may be profitably used for other articles of odd shapes, such as saxophones and musical horns.

The process is characterized by vulcanizing the rubber in two stages, for which reason it may be called a "two-cure" or "two-stage vulcanization" process. Its novel features consist in removing the rubber from the usual mold when only a fractional part of the vulcanization, say about one-third, has taken place, the rubber in this condition being soft and elastic, or soft-cured, though sufficiently rigid to return to its molded shape when distorted. The vulcanization is then completed in a second or final cure or stage, which transforms the soft-cured rubber into hard-cured rubber of the usual rigidity.

At this point it may be well to explain that the term "irregularly cored" is intended to cover such shapes of cores, which when made of single rigid pieces, are not removable from the molded articles without distorting the same.

In the present process, the molded article at the end of the first stage of vulcanization, is forcibly worked, or drawn, away from the core. The process further, includes the joining together of various separate soft rubber or one-cure sections, if desired, by coating the contacting surfaces of adjoining sections with a hard rubber vulcanizing cement, which causes the article so assembled, to be completely vulcanized as one piece, in the second or final stage. Also, at the end of the first stage, any insert of metal or other suitable material, may be joined to the rubber by coating each of the contacting surfaces with the hard rubber vulcanizing cement, assembling the parts with the coated surfaces in contact, and completing the vulcanization.

By the use of an interlocking joint the contacting surfaces may or may not be coated with the hard rubber vulcanizing cement.

The features of this invention, for which the protection of Letters Patent is desired, are collectively grouped in the claims by which this specification is concluded.

As an example of the practical use of this process, its application to the manufacture of loud-speaker horns is illustrated in the drawing, wherein:

Fig. 1 represents a longitudinal vertical center section of a horn, and

Fig. 2, an enlarged fragmentary detail of an interlocking joint.

Referring to the drawing, the horn consists of the goose-neck 20 and the bell 21. At the lower end of the goose-neck is inserted a metal ferrule 24.

The goose-neck 20 is molded in the usual manner, but preferably with a rigid one-piece core conforming to the interior configuration of the goose-neck. The core may have an extension or lug defined by the dotted lines 25.

In making the goose-neck, the core is placed in a mold, rubber is partially vulcanized in the mold around the core, the goose-neck removed from the mold, and the core removed from the goose-neck, which may be accomplished by placing the lug 25 in a vise, and forcibly drawing the elastic goose-neck over the core substantially in the direction of the arrows 26. The goose-neck may now be completely vulcanized without mold or core, or if it is desired to make the entire horn as shown in Fig. 1, the first cure or soft rubber goose-neck, is assembled with the first cure or soft rubber bell, the ferrule 24 is inserted in the lower end of the goose-neck the entire assemblage subjected to the second cure or final vulcanizing stage, without core or mold, leaving the horn in its final rigid form.

It must be understood that the contacting surfaces 27, between the bell and the goose-neck and the contacting surface 28, between the goose-neck and the ferrule, should be coated with the hard rubber vulcanizing cement before assembling them.

If the joint shown in Fig. 2 is used, the contacting surfaces thereof, may or may not be coated with the cement. This joint, if carefully made, will be perfectly tight without cement because the enlarged portion 30 of the goose-neck 20, interlocks with the enlarged portion 31 of the bell 21, effectually preventing any movement between the goose-neck and the bell when the vulcanization of the rubber is completed. At the same time the goose-neck and the bell may be easily slipped together into the interlocked position while the parts are in the soft-cure condition.

By making the portion 24 of the goose-neck heavier than the portion 34 of the bell, the relatively greater shrinkage of the portion 24 locks the goose-neck securely around the bell.

The hard rubber vulcanizing cement is so compounded that its complete vulcanization to hard-cured rubber, shall take place in the time allotted to the final vulcanizing stage of the goose-neck and the bell.

Having fully described our method, what we claim is:

1. The method of making irregularly shaped objects in hard rubber or the like, consisting in placing a core in a mold, partially curing rubber in the mold around the core to a stage where the rubber may be temporarily distorted, removing the object from the mold, removing the core by distorting the object, and completing the cure without the use of mold or core.

2. The method of making goose-necks or other irregularly shaped objects or rubber, consisting in using a one-piece core, placing the core in a mold, partially vulcanizing rubber in the mold around the core in the usual manner, removing the goose-neck from the mold, removing the core from the goose-neck, inserting a ferrule in the goose-neck, the contacting surfaces of ferrule and goose-neck having first been coated with hard rubber vulcanizing cement, and completing the vulcanization of the goose-neck without use of mold or core.

3. The method of making one-piece horns or other irregularly shaped articles of rubber, consisting in interlocking two or more soft-cured rubber sections together, and completing the vulcanization of the assemblage in a hard-cure stage.

4. The method of making one-piece horns or other irregularly shaped articles in hard rubber or the like, consisting in interlocking two or more soft-cured sections together, and completing the vulcanization of the rubber in a hard-cure stage without mold or core.

In testimony whereof, we sign our names hereto.

ALBERT E. SIDNELL.
EMILIUS C. F. HARTMANN.